United States Patent [19]

Strapazzini

[11] Patent Number: 5,529,742
[45] Date of Patent: *Jun. 25, 1996

[54] METHOD FOR FORMING PLASTIC MOLDED PANELS WITH INSERTS

[76] Inventor: Vittorio Strapazzini, c/o Duotec Products Associates 5501 Enterprise Ct., Warren, Mich. 48092

[*] Notice: The term of this patent shall not extend beyond the expiration date of Pat. No. 3,891,031.

[21] Appl. No.: 241,970

[22] Filed: May 12, 1994

Related U.S. Application Data

[63] Continuation of Ser. No. 798,576, Nov. 26, 1991, Pat. No. 5,340,425, which is a continuation of Ser. No. 517,928, May 2, 1990, Pat. No. 5,091,031.

[51] Int. Cl.⁶ .......................... B29C 51/10; B29C 51/12
[52] U.S. Cl. ............................................. 264/511; 156/245
[58] Field of Search ..................... 156/211, 212, 156/245, 247, 248, 257, 267, 268, 290, 250, 308.4; 264/46.6, 46.8, 139, 152, 163, 511

[56] References Cited

U.S. PATENT DOCUMENTS

| | | | |
|---|---|---|---|
| 2,744,564 | 5/1956 | Woodburn | 156/268 |
| 2,749,640 | 6/1956 | Scott | 264/139 |
| 3,080,267 | 3/1963 | Schmalz | 264/46.8 |
| 3,419,447 | 12/1968 | Hewitt | 156/251 |
| 3,546,841 | 12/1970 | Smith et al. | 264/46.8 |
| 3,647,587 | 3/1972 | MacDonald | 156/308.4 |
| 3,996,088 | 12/1976 | Crouch | 156/308.4 |
| 4,793,884 | 12/1988 | Horikiri | 156/268 |
| 4,810,452 | 3/1989 | Tailefert et al. | 264/46.4 |
| 4,978,407 | 12/1990 | Ardissone | 264/248 |

FOREIGN PATENT DOCUMENTS

| | | | |
|---|---|---|---|
| 2746686 | 4/1979 | Germany | 264/511 |
| 53-112977 | 10/1978 | Japan | 264/152 |
| 53-112976 | 10/1978 | Japan | 264/152 |
| 62-019419 | 1/1987 | Japan | 264/163 |
| 62-211128 | 9/1987 | Japan | 264/25 |
| 63-078716 | 4/1988 | Japan | 264/511 |
| 1280535 | 11/1989 | Japan | 264/163 |
| 338021 | 6/1956 | Switzerland | 156/251 |

*Primary Examiner*—Catherine Timm
*Attorney, Agent, or Firm*—Harness, Dickey & Pierce

[57] ABSTRACT

Plastic panels which are useful as automotive interior trim panels, interior door panels and the like decorative and structural panels, are made by a method which integrates insert sections in the surfaces of the panels and eliminates insert edge trim molding strips. The method includes bonding at least the edge portions of the inserts upon a thin plastic sheet, pre-sized blank, then removing the plastic sheet portions that overlap the insert within the bonded portions; next, positioning the blank in a mold against a mold face and molding in situ and simultaneously bonding a plastic substrate against the blank and the exposed surface of the insert. A substantially continuous, channel forming means, such as a narrow rib or a groove, on the mold face, is overlapped by the bonded insert edge portions and sheet portion, which are folded by said means to form a narrow, relatively deep channel. The insert edges are part of and, consequently, are concealed within the channel. The channel forms an edging around the insert in the completed panel surface. Thus, the composite sheet and insert forms an exposed, decorative surface on the molded plastic panel.

4 Claims, 2 Drawing Sheets

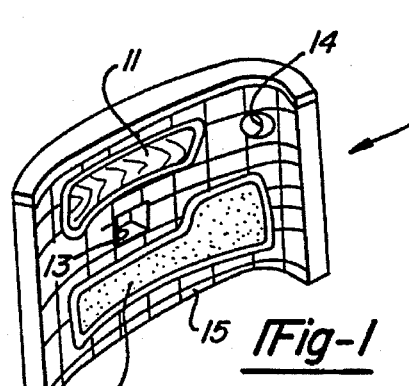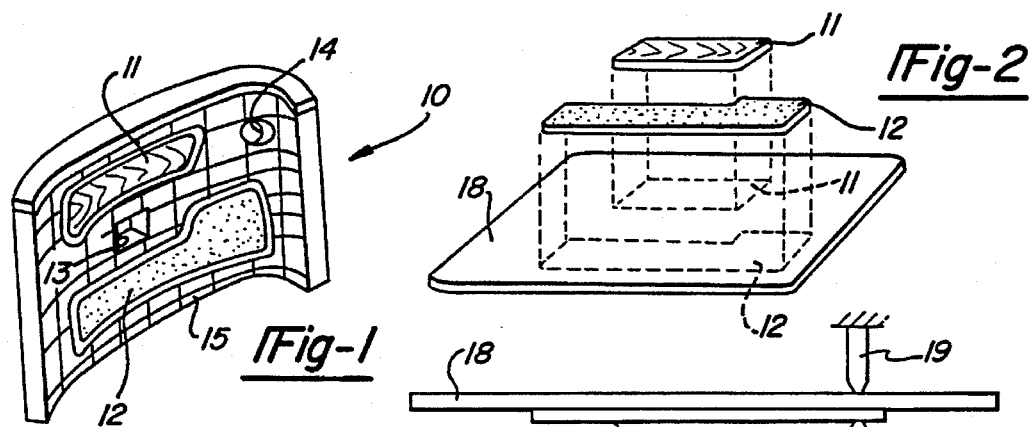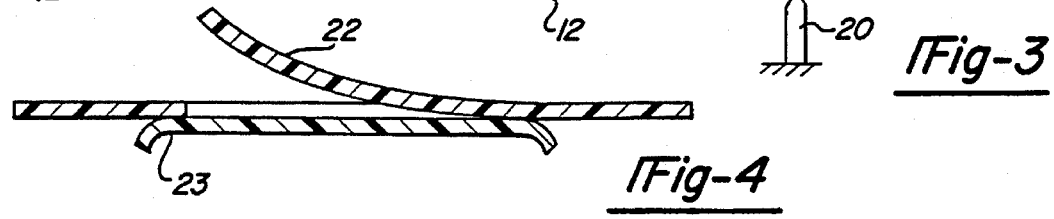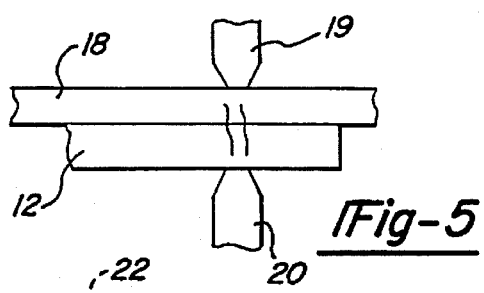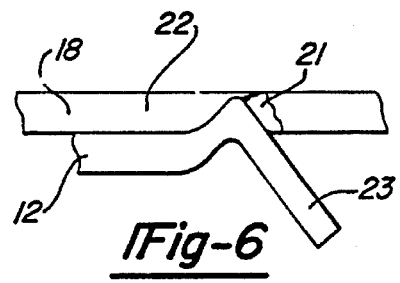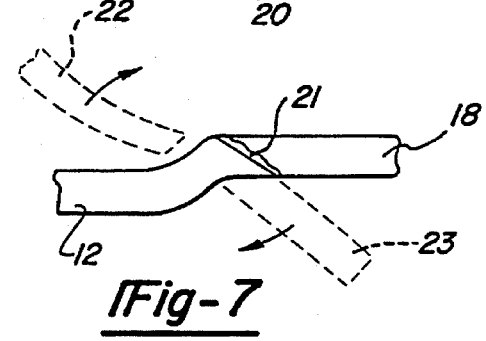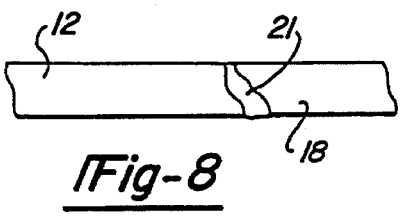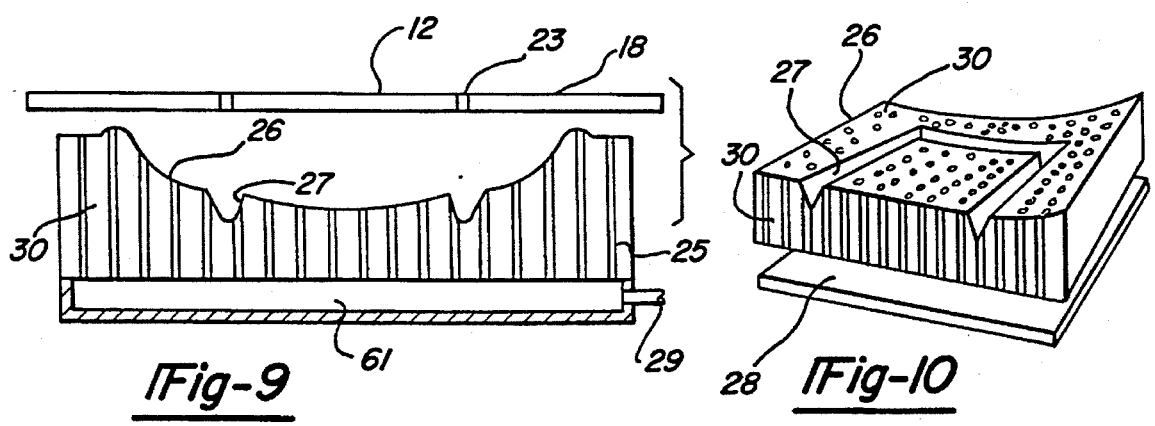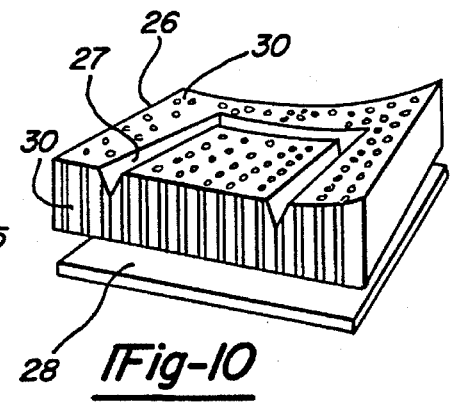

METHOD FOR FORMING PLASTIC MOLDED PANELS WITH INSERTS

This is a continuation of U.S. patent application Ser. No. 798,576 filed Nov. 26, 1991, now U.S. Pat. No. 5,340,425 issued Aug. 23, 1994 which is a continuation of U.S. patent application Ser. No. 517,928 filed May 2, 1990, now U.S. Pat. No. 5,091,031 issued Feb. 25, 1992.

BACKGROUND OF INVENTION

This invention relates to a composite, molded panel which may be shaped to form an interior door panel or an interior trim panel for a vehicle or to form similar types of panels used for other purposes. It is especially useful in producing vehicle interior door and trim panels having decorative inserts which differ in appearance and composition from other portions of the surfaces of the panels.

Interior door panels for vehicles are typically made by first forming a preselected size and shape foundation board made of stiff particle board, fiber board, or plastic board-like material. Then, one or more cloth-like sheets are fastened to the surface of the board. The board may also function to support other items, such as window regulator parts, small motors, wiring and the like, which are located upon or within the door. In many vehicles, the interor surfaces of the door panels are decoratively enhanced by adding inserts upon the panel. The inserts may be in the form of smaller sections or panels which may be formed, for example, of carpet-like sheets or sheets with heavily textured surfaces or sheets of different surface colors or material. Ordinarily, the joint line that appears around each of these inserts is a high frequency welt line or a fabricated trim strip which overlaps and conceals the raw edges of the insert and helps maintain the insert in place.

Typically, the interior door and trim panels of the type described above, are assembled out of separate parts which are positioned upon the foundation board and fastened together, one by one, to provide a complete panel assembly. This assembly is fastened within the metal or plastic door or within other parts of the interior of the vehicle. This technique for manufacturing interior door and trim panels is relatively time-consuming and expensive. Moreover, this limits the ability to significantly contour or curve the interior surfaces of the vehicle. For example, it is difficult to provide a curved or contoured foundation board and to cover such a curved board. Therefore, vehicle interior door surfaces are relatively flat and other trim surfaces are also of limited curvature.

Thus, this invention relates to a plastic molding method for making interior door and trim panels and the like, which may be curved, and which have different inserts molded in place, at reduced costs and with enhanced decorative appearances.

SUMMARY OF INVENTION

The invention herein contemplates molding a plastic panel by, first, preparing a thin, flexible plastic sheet which is sized and shaped to form a blank upon which sheet-like inserts of various types may be mounted. The inserts are bonded along their edges to the sheet and the portions of the sheet which overlap the inserts between the bonded areas are removed. This exposes most of the inner faces of the inserts through the blank. The blank, with the inserts, is positioned within a mold which has raised ribs that encircle the inserts. The ribs are positioned to contact the bonded edge portions of the inserts. Those bonded portions and adjacent sheet portions wrap around the ribs to form narrow, outwardly opening channels within which the raw edges of the inserts are concealed. Next, plastic molding material is placed within the mold and is molded in situ to form a relatively rigid plastic molded substrate whose exposed, outer surface is made up of the composite of the plastic sheet blank and the inserts of different materials and textures which are carried by the blank. The inserts are bordered by the channels.

Since the substrate is molded in situ within the thin plastic sheet blank, other objects may be simultaneously molded upon or within the substrate. For example, window parts, wires, drain tubes and the like may be molded within the substrate. Alternatively, the substrate may be provided with integral portions that are configured to receive or to mount exterior mechanical parts or trim elements. Thus, this method may economically produce, for example, an interior door panel which may have curved portions and which carries separately mounted or integrally formed arm rests or window controls or other items mounted thereon, while providing an enhanced decorative appearance.

A major object of this invention is to provide a method which produces panels that have inserts of different textures or types of materials for decorative enhancement, but wherein the normal edge trim molding which has been required in the past to conceal and protect the edges of the inserts may be completely eliminated. Thus, the molding method includes forming a channel that conceals the raw edges of the insert panels and, simultaneously, provides a decorative edging in the panel surfaces around the inserts.

Still a further object of this invention is to provide a method for rapidly and economically producing vehicle door panels and interior trim panels and the like with a minimum of labor and with better, more uniform quality than has previously been possible utilizing the typical panel assembly techniques which have been used in the past for making door interior panels and trim panels.

These and other objects and advantages of this invention will become apparent upon reading the following description, of which the attached drawings form a part.

DESCRIPTION OF DRAWINGS

FIG. 1 is a perspective view of an automobile interior door panel which schematically illustrates a panel made in accordance with the method described herein.

FIG. 2 is a perspective, schematic view illustrating the placement of inserts upon a sheet blank.

FIG. 3 schematically shows heat bonding the edge portions of an insert to the blank.

FIG. 4 schematically illustrates the removal of the portion of the blank which overlaps the insert and the selvage portion of the insert.

FIG. 5 is an enlarged, schematic view of the heat seal blades welding the insert to the blank.

FIG. 6 is an enlarged, schematic view of the welded joint of the insert and blank.

FIG. 7 is an enlarged, schematic view of the joint of FIG. 6, but showing the removal of portions of the blank and insert.

FIG. 8 is an enlarged, schematic view of the insert aligned with the blank at their welded joint.

FIG. 9 is a schematic, cross-sectional illustration of a female, vacuum forming mold with a blank positioned above it.

FIG. 10 is a schematic, fragmentary section of the vacuum mold of FIG. 9, showing insert edge receiving grooves.

DETAILED DESCRIPTION

Figure 11:
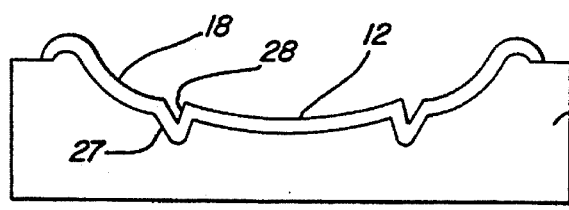
FIG. 11 is a schematic, cross-sectional illustration of the blank with an attached insert positioned within the vacuum forming mold cavity.

FIG. 1 schematically illustrates an example of an interior door panel 10 for an automobile. The panel 10 is illustrated as being formed with curved opposite ends. It is sized and shaped to fit within a sheet metal door for trimming the interior of the door within the passenger compartment of a vehicle. The panel includes, for illustration purposes, an upper panel insert 11 which may have an interior face formed so as to simulate a wood grain appearance. Similarly, a lower insert 12 is positioned in the panel and may be formed of a pile, carpet-like material, to simulate a carpeted section of the panel.

The panel may be provided with various openings or receptacle areas, after the molding is completed, to receive some of the hardware which is typically mounted within a vehicle door. These openings or areas may be cut or punched in the panel. For example, the panel may have a square or oblong opening 13 to receive a block of switches which operate the window actuating motors, and a round opening 14 which may receive a switch for actuating the exterior side view mirrors. Different size and shape openings and receptacle areas may be molded in the panel as required.

The interior surface 15 of the panel may be formed with embossments or may be textured. These decorative surface configurations may be formed during the molding of the panel door or may be preformed in the sheet or blank utilized in the molding.

The molding process involves starting with a sheet 18 which is cut or formed into a desired size to provide a blank for molding purposes. Preferably, the sheet is selected from a thin, plastic film, such as a 20 mil thickness vinyl plastic material. Other suitable plastic sheet materials, of appropriate thicknesses, may be selected for this purpose. The sheet may have a face which is pre-embossed or pretextured. Alternatively, it may be textured or embossed during the molding process in the mold.

The next step in the process involves positioning the inserts, as for example, the upper insert 11 and the lower insert 12, upon one face of the blank, as illustrated in FIG. 2. Next, the inserts are bonded to the blank by heat sealing or the like. For this purpose, high frequency welding or dielectric welding may be used. To illustrate this, FIG. 3 schematically shows an upper heat seal blade 19 and a lower heat seal base blade 20 forming a heat weld or bead 21. The heat seal blades may consist of moving heated elements or of a complete frame or platten unit which applies heat along the border portions of the insert for bonding the insert to the sheet. The specific welding machinery or equipment utilized for this purpose may vary considerably, depending upon availability, cost, nature of the bonding required for the particular plastic material involved, etc. Thus, those skilled in the art may select the appropriate equipment for this purpose from commercially available equipment.

As shown in FIG. 4, once the insert is bonded to the blank, the sheet portions 22 of the blank which overlap the insert and the selvage portions 23 of the insert are torn away. FIG. 6 shows the welded joint with the free insert selvage 23. FIG. 7 shows the tearing away of the unwanted portions of the sheet and insert. The removal of the portion of the sheet which overlaps the insert permits the insert to be arranged substantially coplanar with the sheet and exposes the insert face within a window-like opening in the sheet as illustrated in FIG. 8. That leaves the welded joint 21 surrounding the insert.

Next, the blank is placed within a female, vacuum forming mold 25 which is schematically shown in FIG. 9. This mold includes a molding cavity 26 and grooves 27 which are formed in the cavity surface and extend into the mold. The grooves form a continuous frame-like depression which outlines the insert and which is positioned to receive the welded joint 21 between the edges of the insert and the sheet.

The vacuum mold 25 has a vacuum chamber 61 formed beneath it, with a hose 29 connected to a vacuum pump (not shown). Numerous holes 30 extend through the mold from the vacuum chamber to the mold cavity surface. Air is sucked from the cavity surface to the vacuum chamber for pulling the blank into the cavity.

Figure 12:
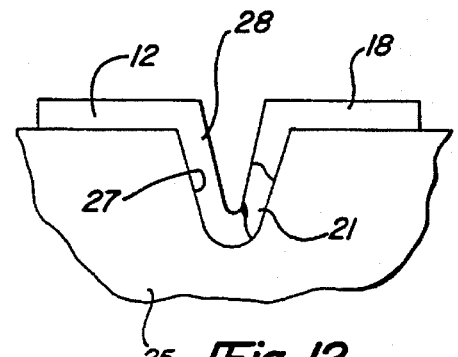
FIG. 12 is an enlarged, fragmentary cross-section of the mold groove with the insert edge portion positioned therein.

As shown schematically in FIGS. 11 and 12, where the blank, with an insert, is positioned within the mold cavity against the mold wall, the sheet and insert welded areas are folded into the grooves to form a sharp channel 28 in the molded blank. The channel 28 outlines the insert, like a free. The weld and the edge of the insert is concealed within this narrow, relatively deep channel.

Figure 13:
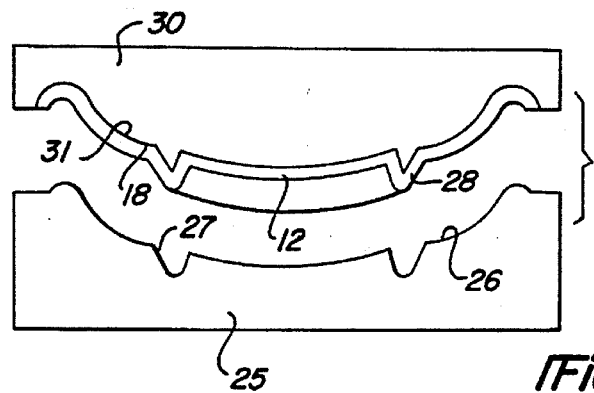
FIG. 13 schematically illustrates the molded blank lifted out of the vacuum forming mold cavity by a transfer mold half.

Next, a transfer tool or mold half 30 having a lower surface 31, which is shaped correspondingly to the molded blank, is positioned with the mold 25. The molded blank adheres to the transfer tool and is lifted out of the vacuum forming mold 25, as shown in FIG. 13.

Figure 14:
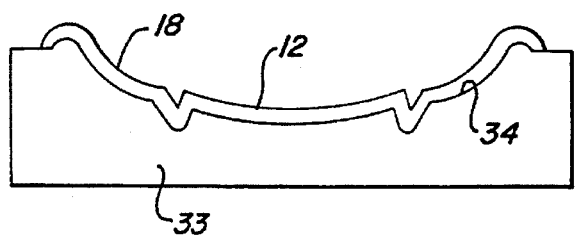
FIG. 14 schematically shows the molded blank positioned within a second transfer mold half.
Figure 15:
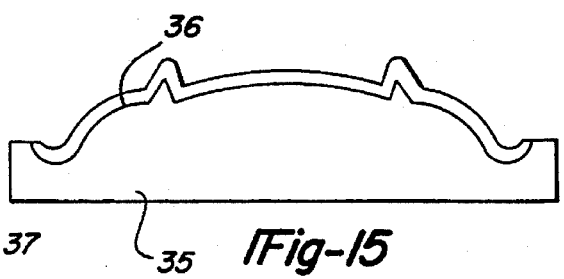
FIG. 15 schematically shows the molded blank positioned upon the male half of the mold.

The transfer tool 30 is moved over a second transfer mold 33 and the molded blank is deposited therein (see FIG. 14). For that purpose the mold 33 is formed with a cavity 34 shaped to receive the molded blank. The second transfer mold is turned 180 degrees so that the molded blank is positioned upon a male mold half 35 (see FIG. 15) having a mold surface 36.

One, or both of the transfer tools may be omitted and, instead, the molded panel may be transferred by hand from the vacuum forming mold to the male mold half 35.

Figure 16:
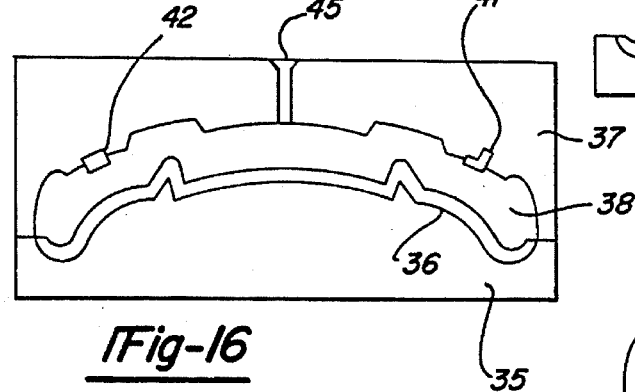
FIG. 16 is a schematic illustration of the mold closed by an opposite mold half so as to provide the complete molding cavity.

Then, as illustrated in FIG. 16, an upper, female mold half 37 is positioned to close the mold cavity 38 for molding the panel substrate 40 upon the molded blank.

The upper mold half 37 may include sub-cavity portions for molding interior parts integrally with the substrate. For example, a sub-cavity portion 41 may be provided for molding a bracket and another sub-cavity portion 42 may be provided for molding a ring or an enlarged boss. In addition, the upper mold half may include a suitable passageway 45 through which plastic may be injected or otherwise placed within the mold cavity.

When the mold is closed, a suitable plastic material may be injected into the mold cavity for injection molding the panel substrate 40 therein. The injected plastic material solidifies in the cavity. Alternatively, expandable plastic beads may be inserted in the mold cavity, either through the passageway 45 or they may be placed in the cavity before the mold is closed. The application of suitable heat for the necessary time causes the expandable beads to mold the substrate in situ within the cavity. After the plastic solidifies the mold panel 10 is removed therefrom.

The molded panel substrate 40 may include integral parts, such as the molded bracket 46, boss 47, and other separate parts positioned in the interior of the mold cavity. Passageways or openings or receptacles also may be formed in the panel during molding. By way of example, an electric motor for operating the window, or part of the window regulator mechanism or wires or switches or drain tubing used for draining water collected within a door, or the like may be positioned in the panel during molding. Also, during the molding process, embossments or texture may be formed on the surface of the sheet 18 by its engagement with the mold wall 36. Thus, the exposed surface of sheet 18, which forms the finished inner surface of the panel, may be provided with predetermined design appearances.

Figure 17:
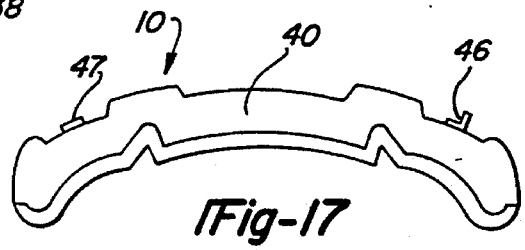
FIG. 17 is a schematic, cross-sectional view of a panel after molding the substrate.
Figure 18:
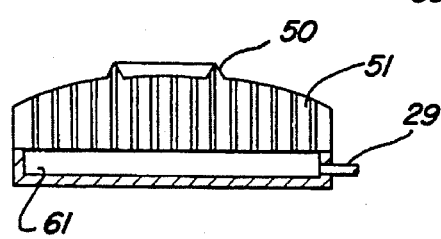
FIG. 18 shows a modified vacuum forming mold.

As shown in FIG. 17, narrow, deep channels 28 are formed by the folding or bending of the welded areas of the insert and sheet 18. A similar effect may be accomplished by forming ribs 50 on a modified vacuum forming mold 51 illustrated in FIG. 18. The ribs form a frame around the insert and are located so that the welded area of the insert 12 and sheet 18 are positioned upon the ribs. Thus, the insert edges and welded joint are concealed in the channels that are formed.

The folded channels 28 around the inserts permit the elimination of the usual metal or plastic edge molding frames or strips which are commonly used in automotive trim panels to conceal and fasten the edges of inserts within their surrounding panel surfaces.

The method described above is particularly useful for molding door panels and, thereby, replacing conventional door panel assemblies which are made up of a number of parts that are fastened together. However, the method is also useful in forming other types of trim panels for vehicles as well as other types of panels for other uses. For example, an interior dashboard panel may be formed with inserts of various types molded in the surface of the panel. As another example, a molded headliner may be formed for use within the upper part of the passenger compartment of a vehicle. Inserts of various kinds may be positioned in the headliner panel. These inserts can be formed of a sound proofing material or of a decorative carpet-like material, etc.

The molding method is useful for producing panels made of a wide variety of materials. By way of example, the panel substrate may be formed of a substantially rigid, structural polyurethane plastic which is commercially available from various chemical companies. The particular plastic selected will depend upon the cost, availability, and ultimate use. Similarly, a commercially available, thin, flexible polyvinyl sheet, e.g., between about 0.050–0.150, or more specifically, between about 0.085–0.135 inches, may be used for the blank. Various commercially available insert materials, such as pile-like carpet, woven fabric materials or the like can be used for the inserts. The molding can be performed in a suitable, commercially available molding machine. Preferably, the V-shaped channels are in the order of between about 0.050–0.10 inches wide at their openings for concealing the welded edge portions.

The overall molded plastic panel is waterproof. Therefore, conventional water shields that typically are utilized within vehicle doors, for protecting the trim panel from water seepage due to water entering into the door cavity, are unnecessary and eliminated. This reduces the cost of the overall door assembly considerably.

This invention may be further developed within the scope of the following claims.

Having fully described an operative embodiment of this invention, I now claim:

1. A method for forming molded panels, having inserts, for use as trim panels or interior door panels, comprising the steps of:

(a) forming a thin, flexible, sheet to a predetermined size and shape to provide a blank having an outer surface and an inner surface;

(b) positioning at least one, initially separate, insert upon the inner surface of the blank and bonding at least a substantially continuous narrow edge band portion to the blank portion which said edge band portion overlaps to form a laminated narrow border strip, wherein said narrow edge band portion defines a peripheral edge of the insert;

(c) positioning the blank with the bonded insert on a vacuum forming mold with the outer surface of the blank and the insert each positioned against a wall of the mold and with said border strip overlying a substantially continuous frame means formed on said mold wall, and vacuum forming the border strip into a narrow continuous channel in the frame means of the mold wall thereby arranging the insert edge band portion within the interior of said channel;

(d) providing a mold pair including two mold halves, transferring said blank into one of the mold halves while the mold pair is open, maintaining position of the blank in the mold half on the mold wall surface;

(e) closing the mold pair and applying and bonding a relatively thick plastic substrate in the closed mold pair against the inner surface of the blank after positioning the blank against the mold half for bonding together the overlapping surfaces of the blank and substrate;

(f) thereafter, removing the molded panel from the mold to provide a composite panel having an exposed exterior surface formed of outer surfaces of the blank and the insert and with the peripheral edges of the insert visually concealed within the channel that opens outwardly of the channel and which channel surrounds the insert and forms a border for the insert.

2. A method for forming molded panels as defined in claim 1, and including applying the substrate by molding the plastic, which forms the substrate, in situ within the mold against the inner surface of the bank.

3. A method for forming molded panels, having inserts, for use as trim panels or interior door panels, comprising the steps of:

(a) forming a thin, flexible, sheet to a predetermined size and shape to provide a blank having an outer surface and an inner surface;

(b) positioning at least one, initially separate, insert adjacent the inner surface of the sheet and bonding at least a substantially continuous narrow edge portion to the blank portion which said edge band portion overlaps to form a laminated narrow border strip, wherein said narrow edge portion defines an edge of the insert (c) positioning the sheet and the bonded insert on a vacuum forming mold with the outer surface of the sheet and the insert each positioned against a wall of the mold and with said border strip overlying a substantially continuous frame means formed on said mold wall, and vacuum forming the border strip into a narrow continuous channel in the frame means of the mold wall thereby arranging the insert edge portion within the interior of said channel;

(d) providing a mold pair including two mold halves, transferring said blank into one of the mold halves while the mold pair is open, maintaining position of the blank in the mold half on the mold wall surface;

(e) closing the mold pair and applying and bonding a relatively thick plastic substrate in the closed mold pair against the inner surface of the sheet after positioning the sheet against the mold half for bonding together the overlapping surfaces of the sheet and substrate;

(f) thereafter, removing the molded panel from the mold to provide a composite panel having an exposed exterior surface formed of outer surfaces of the sheet and the insert and with the edge of the insert visually concealed within the channel.

4. A method for forming molded panels as defined in claim 3, and including applying the substrate by molding the plastic, which forms the substrate, in situ within the mold against the inner surface of the sheet.

* * * * *